United States Patent

Coates et al.

Patent Number: 5,190,692
Date of Patent: Mar. 2, 1993

[54] FOUR RING ESTERS AND ETHERS

[75] Inventors: David Coates, Dorset; Simon Greenfield, Poole, both of Great Britain

[73] Assignee: Merck Patent Gesellschaft mit Beschrankter Haftung, Darmstadt, Fed. Rep. of Germany

[21] Appl. No.: 492,144

[22] Filed: Mar. 13, 1990

[30] Foreign Application Priority Data

Mar. 14, 1989 [GB] United Kingdom ............... 8905840

[51] Int. Cl.$^5$ ............... C09K 19/30; C07C 69/76; C07C 41/00
[52] U.S. Cl. ............... 252/299.63; 252/299.5; 568/631; 568/647; 560/65
[58] Field of Search ............... 252/299.01, 299.63, 252/299.5; 568/631, 647; 560/65

[56] References Cited

U.S. PATENT DOCUMENTS

| | | | |
|---|---|---|---|
| 4,368,135 | 1/1983 | Osman | 252/299.63 |
| 4,472,592 | 9/1984 | Takatsu et al. | 560/1 |
| 4,565,425 | 1/1986 | Petrzilka et al. | 350/350 R |
| 4,602,851 | 7/1986 | Jenner et al. | 350/350 R |
| 4,637,897 | 1/1987 | Kelly | 252/299.63 |
| 4,708,441 | 11/1987 | Petrzilka et al. | 350/346 |
| 4,846,998 | 7/1989 | Pohl et al. | 252/299.63 |
| 4,911,863 | 3/1990 | Sage et al. | 252/299.65 |
| 4,943,384 | 7/1990 | Sucrow et al. | 252/299.61 |

*Primary Examiner*—Robert L. Stoll
*Assistant Examiner*—C. Harris
*Attorney, Agent, or Firm*—Millen, White, Zelano and Branigan

[57] ABSTRACT

Four ring esters and ethers of formula I

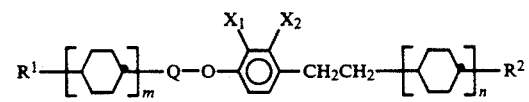

wherein
  $R^1$ and $R^2$ independently from each other are alkyl or alkenyl with up to 9 carbon atoms or such residues wherein one $CH_2$ group is replaced by oxygen,
  m and n are each 1 or 2, the sum of m and n being 3,
  $X^1$ and $X^2$ are each hydrogen or fluorine, and
  Q is $-CH_2-$ or $-CO-$ with the proviso that in case $m=2$ Q is $-CH_2-$ and/or at least one of $X^1$ and $X^2$ is F are suitable as components of liquid crystal media.

15 Claims, No Drawings

FOUR RING ESTERS AND ETHERS

SUMMARY OF THE INVENTION

The invention relates to four ring esters and ethers of formula I

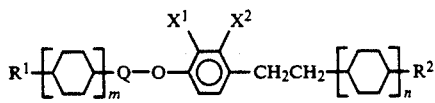

wherein $R^1$ and $R^2$ independently from each other are alkyl or alkenyl with up to 9 carbon atoms or such residues wherein one $CH_2$ group is replaced by oxygen;

m and n are each 1 or 2, the sum of m and n being 3, $X^1$ and $X^2$ are each hydrogen or fluorine, and Q is $-CH_2-$ or $-CO-$
with the proviso that in case m=2 Q is $-CH_2-$ and/or at least one of $X^1$ and $X^2$ is F.

The compounds of the formula I can be used as components of liquid crystal media, in particular for displays which are based on the principle of the twisted nematic cell, including TN cells with a higher twist angle like STN (supertwisted nematic), SBE (supertwisted birefringence), OMI (optical mode interference) etc. on the guest-host effect, on the effect of deformation of orientated phases or on the effect of dynamic scattering.

Compounds similar to those of formula I are known from DE 34 10 734. These compounds comprising 2 or 3 rings exhibit on the one hand a negative dielectric anisotropy. But on the other hand they have a rather small mesophase range and generally show smectic structures.

Compounds of the formula I with $Q=-CH_2-$ are claimed in EP 0,084, 194 via a very broad formula. There are, however, no specific examples for these compounds so that it may be stated that the surprisingly advantageous properties of these compounds have neither been realized nor used.

In JP 60-226845 laterally unsubstituted four ring esters of formula I with m=2, Q=CO and $X^1=X^2=H$ are described. These compounds, however, exhibit rather poor values for the flow viscosity $\eta$.

The invention was based on the object of discovering new stable liquid crystalline or mesogenic compounds which are especially suitable for supertwist displays without exhibiting the shortcomings of the prior art compounds.

Surprisingly, it has been found that the compounds according to formula I meet these criteria to an outstanding degree and allow the realization of very steep electrooptic characteristics and simultaneously a low temperature dependency of the threshold voltages in particular in supertwist displays.

By providing the compounds of the formula I, the range of liquid crystal substances which are suitable, under various technological aspects for the preparation of nematic mixtures is also quite generally widened considerably.

The compounds of the formula I have a wide field of application. Depending on the selection of the substituents, these compounds can be used as base materials from which liquid crystal phases are predominantly composed; however, compounds of the formula I can also be added to liquid crystal base materials from other classes of compounds, for example in order to optimize the dielectric and/or optical anisotropy of such a dielectric.

The compounds of the formula I are colorless in the pure state and form liquid crystal mesophases in a temperature range which is favorably placed for electrooptical use. They are very stable towards chemicals, heat and light.

The invention thus relates to the compounds of the formula I and the use of these compounds as components of liquid crystal media. The invention furthermore relates to liquid crystal media containing at least one compound of the formula I and to liquid crystal display elements, in particular electrooptical display elements, which contain media of this type. The invention further relates to a process for the preparation of the compounds according to formula I.

Above and below $R^1$, m, Q, $X^1$, $X^2$, n and $R^2$ have the mentioned meaning, unless expressly stated otherwise.

The compounds of the formula I accordingly include esters of the part formulae Ia1 and Ia2, and ethers of the part formulae Ib1 and Ib2

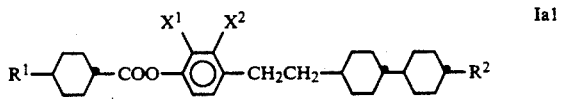

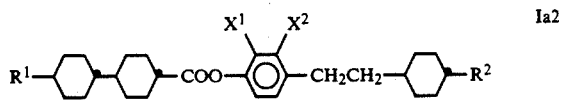

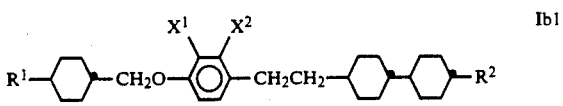

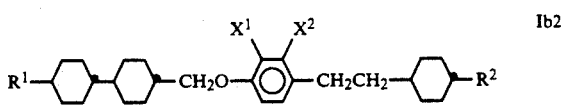

In the compounds of these formulae $R^1$ and $R^2$ are preferably alkyl, furthermore also alkenyl or alkyl or alkenyl groups in which one $CH_2$-group is replaced by oxygen.

The 1,4-phenylene group may be unsubstituted or laterally 2-mono-, 3-mono- or 2,3-disubstitued by F. Preferably $X^1$ is fluorine and $X^2$ is hydrogen.

The laterally monosubstituted and in particular the laterally difluorinated compounds are preferred.

If $R^1$ and/or $R^2$ are alkyl and/or alkoxy groups, these can be straight-chain or branched. Preferably, they are straight-chain and have 2, 3, 4, 5, 6 or 7 C atoms and are accordingly preferably ethyl, propyl, butyl, pentyl, hexyl, heptyl, ethoxy, propoxy, butoxy, pentoxy, hexoxy or heptoxy, also methyl, octyl, nonyl, methoxy, octoxy or nonoxy.

Oxaalkyl is preferably straight-chain 2-oxapropyl (=methoxymethyl), 2-(=ethoxymethyl) or 3-oxybutyl (=2-methoxyethyl), 2-, 3- or 4-oxapentyl, 2-, 3-, 4- or 5-oxahexyl, 2-, 3-, 4-, 5- or 6-oxaheptyl or 2-, 3-, 4-, 5-, 6- or 7-oxaoctyl.

If $R^1$ and/or $R^2$ are alkenyl groups these can be straight-chain or branched. Preferably, they are straight-chain and have 2 to 8 C atoms. They are accordingly, in particular, vinyl, prop-1- or prop-2-enyl, but-1-, -2- or -3-enyl, pent-1-, -2-, -3-, -4-, -5- or -6-enyl or oct-1-, -2-, -3-, -4-, -5-, -6- or -7-enyl.

If $R^1$ and/or $R^2$ are alkenoxy groups these can be straight chain or branched. Preferably they are straight-chain and are given via formula II

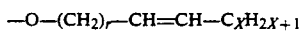

wherein r is 1 or 2 and X runs from 0 to 6.

Trans-isomers of both the alkenyl and the alkenoxy groups are preferred.

Compounds of the formula I with branched terminal groups $R^1$ and/or $R^2$ can be of importance because of a better solubility in the customary liquid crystal base materials, but in particular as chiral doping substances if they are optically active.

Branched groups of this type as a rule contain not more than one chain branching. Preferred branched groups are isopropyl, 2-butyl (=1-methylpropyl), isobutyl (=2-methylpropyl), 2-methylbutyl, isopentyl, (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy (=2-octyloxy), 2-oxa-3-methylbutyl, 3-oxa-4-methylpentyl, 4-methylhexyl and 6-methyloctoxy.

In the case of compounds with branched terminal groups, formula I includes both the optical antipodes and racemates as well as mixtures thereof.

Of the compounds of the formula I and subformulae thereof, those in which at least one of the radicals contained therein has one of the preferred meanings given are preferred.

The compounds of the formula I are prepared by methods which are known per se, such as are described in the literature (for example in the standard works, such as Houben-Weyl, Methoden der Organischen Chemie [Methods of Organic Chemistry], Gerog-Thieme-Verlag, Stuttgart), and in particular under reaction conditions which are known and suitable for the reactions mentioned. Variants which are known per se and are not mentioned in more detail here can also be used in this connection.

If desired, the starting substances can also be formed in situ, such that they are not isolated from the reaction mixture but are immediately reacted further to give the compounds of the formula I.

The ester group (Q=—CO—) can be introduced as linking group by esterification of carboxylic acids of formula III

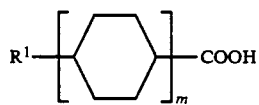

or their reactive derivatives, wherein $R^1$ and m have the meaning indicated, with phenols of formula IV

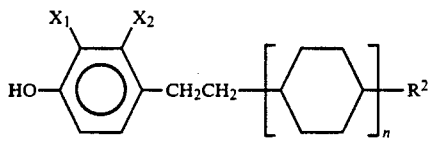

or their reactive derivatives, wherein $X^1$, $X^2$, n and $R^2$ have the meaning indicated.

Carboxylic acids of formula III are disclosed in DE 2429093 and in U.S. Pat. No. 4,181,625 corresponding to 2702598.

Particularly suitable reactive derivatives of the carboxylic acids mentioned are the acid halides, above all the chlorides and bromides, and furthermore the anhydrides, for example also mixed anhydrides, azides or esters, in particular alkyl esters with 1-4 C atoms in the alkyl group.

Phenols of formula IV with both $X^1$ and $X^2$ meaning H are known from U.S. Pat. No. 4,439,015 corresponding to DE 3201721 (n=1) and U.S. Pat. No. 4,606,845 corresponding to DE 3317597 (n=2).

Fluorinated compounds of formula IV can be obtained by converting the corresponding fluorinated aryl bromids via a Grignard reaction into the boronic acids, which are treated with hydrogen peroxide in diethyl ether to give the phenols of formula IV.

Possible reactive derivatives of the phenols mentioned are, in particular, the corresponding metal phenolates, preferably of an alkali metal, such as sodium or potassium.

Ethers of formula I (Q=—CH$_2$—) can be prepared for example via a reaction of phenols of formula IV or the corresponding alkali phenolates with halides of formula V

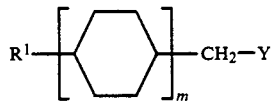

or reactive derivatives thereof, wherein $R^1$ and m have the meaning indicated and Y is halogene.

Halides of formula V can be easily prepared; for example, they can be derived from the carboxylic acids of formula III these being firstly reduced to the corresponding alcohols, the hydroxy group of which being substituted by halogen. Suitable reactive derivatives of the halides mentioned are sulfonates or dialkylsulfonates.

The optimum reaction conditions for all these reactions are described extensively in the literature.

Other methods of making compounds of formula I are apparent to those skilled in the art.

In addition to one or more compounds of formula I the liquid crystal media according to the invention preferably contain 2–40 components and in particular 4–30 components. Liquid crystal media being composed of one or more compounds of formula I and 7–25 other components are especially preferred.

These additional components are preferably chosen from the nematic or nematogenic (monotropic or isotropic) substances; in particular from the classes of azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenylbenzoates, cyclohexylphenyl cyclohexanecarboxylates, cyclohexylphenyl cyclohexylcyclohexanecarboxylates, phenylcyclohexanes, cyclohexylbiphenyls, phenylcyclohexylcyclohexanes, cyclohexylcyclohexanes, cyclohexylcyclohexenes, cyclohexylcyclohexylcyclo hexene, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl) ethanes, 1-cyclohexyl-2-biphenylethanes, 1-phenyl-2-cyclohexyl-phenylethanes, optionally halogenated stilbenes, benzyl phenyl ethers, tolanes and substituted cinnamic acids.

The 1,4-phenylene groups of these compounds may be fluorinated.

Important compounds which are possible constituents of liquid crystal media according to the invention can be characterized by the formulae 1, 2, 3, 4 and 5:

$$R'-L-E-R'' \qquad 1$$

$$R'-L-COO-E-R'' \qquad 2$$

$$R'-L-OOC-E-R'' \qquad 3$$

$$R'-L-CH_2CH_2-E-R'' \qquad 4$$

$$R'-L-C\equiv C-E-R'' \qquad 5$$

In the formulae 1, 2, 3, 4 and 5 L and E may be equal or different from each other. L and E independently from each other denote a bivalent residue selected from the group consisting of —Phe—, —Cyc—, —Phe—Phe—, —Phe—Cyc—, —Cyc—Cyc—, —Pyr—, —Dio—, —G—Phe—, —G—Cyc— and their mirror images; in this compilation of residues Phe denotes unsubstituted or fluorinated 1,4-phenylen, Cyc trans- 1,4-cyclohexylene or 1,4-cyclohexenylene, Pyr pyrimidine-2,5-diyl or pyridine-2,5-diyl, Dio 1,3-dioxane-2,5-diyl and G 2-(trans-1,4-cyclohexyl)-ethyl, pyrimidine-2,5-diyl, pyridine-2,5-diyl or 1,3-dioxane-2,5-diyl.

One of the residues L and E is preferably Cyc, Phe or Pyr. E preferably denotes Cyc, Phe or Phe—Cyc. The liquid crystal media according to the invention preferably contain one or more components selected from the compounds of formulae 1, 2, 3, 4 and 5 with L and E meaning Cyc, Phe and Pyr, said liquid crystal media further containing at the same time one ore more components selected from the compounds of formulae 1, 2, 3, 4 and 5 with one of the residues L and E denoting Cyc, Phe and Pyr and the other residue being selected from the group consisting of —Phe—Phe—, —Phe—Cyc—, —Cyc—Cyc—, —G—Cyc—, said liquid crystal media containing in addition to this optionally one or more components selected from the compounds of formulae 1, 2, 3, 4 and 5 with L and E being selected from the group consisting of —Phe—Cyc—, —Cyc—Cyc—, —G—Phe— and —G—Cyc.

In a preferred subgroup of the compounds of formulae 1, 2, 3, 4 and 5 (subgroup 1) R' and R" are independently from each other alkyl, alkenyl, alkoxy, alkenoxy with up to 8 carbon atoms. R' and R" differ from one another in most of these compounds, one of the residues usually being alkyl or alkenyl. In another preferred subgroup of the compounds of formulae 1, 2, 3, 4 and 5 (subgroup 2) R" denotes —CN, —CF$_3$, —F, —Cl or —NCS while R' has the meaning indicated in subgroup 1 and is preferably alkyl or alkenyl. Other variants of the envisaged substituents in the compounds of formulae 1, 2, 3, 4 and 5 are also customary. Many such substances are commercially available. All these substances are obtainable by methods which are known from the literature or by analogous methods.

The liquid crystal media according to the invention preferably contain in addition to components selected from subgroup 1 also components of subgroup 2, the percentage of these components being as follows:

subgroup 1: 20 to 90%, in particular 30 to 90%
subgroup 2: 10 to 50%, in particular 10 to 50%

In these liquid crystal media the percentages of the compounds according to the invention and the compounds of subgroup 1 and 2 may add up to give 100%.

The media according to the invention preferably contain 1 to 40%, in particular 5 to 30% of the compounds according to the invention. Media containing more than 40%, in particular 45 to 90% of the compounds according to the invention are further preferred. The media contain preferably 3, 4 or 5 compounds according to the invention.

The media according to the invention are prepared in a manner which is customary per se. As a rule, the components are dissolved in one another, advantageously at elevated temperature. The liquid crystal media according to the invention can be modified by suitable additives so that they can be used in all the types of liquid crystal display devices. Such additives are known to the expert and are described in detail in the literature (H. Kelker/R. Hatz, Handbook of Liquid Crystals, Verlag Chemie, Weinheim, 1980). For example, it is possible to add pleochroic dyestuffs to prepare colored guest-host systems or substances for modifying the dielectric anisotropy, the viscosity and/or the orientation of the nematic phases.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding British Appln. Ser. No. 8905840.8, filed Mar. 14, 1989, are hereby incorporated by reference.

m.p. = melting point, c.p. = clearing point, "customary work-up" means that water is added, the mixture is extracted with methylene chloride, the organic phase is separated off, dried and evaporated, and the product is purified by crystallization and/or chromatography.

Further are:

C: crystalline-solid state, S: smectic phase (the index denoting the type of smectic phase), N: nematic phase, Ch: cholesteric phase, I: isotropic phase. The number being embraced by 2 of these symbols denotes the temperature of phase change.

EXAMPLES OF PRODUCTION

Example 1

1.1 mol eq of 1-(4-propylcyclohexyl)-2-(4-hydroxyphenyl)ethane and 1.0 mol eq 4-(4-propylcyclohexyl)-cyclohexyl carboxylic acid are treated in dichlormethane with 1.1 mol eq trifluoroacetic anhydride. After 1 hour at room temperature the reaction mixture is poured into water and the separated organic layer is worked up customarily to give 4-[(4-propylcyclohexyl)-ethyl]-phenyl-4-(4-propylcyclohexyl)-cyclohexyl carboxylate. This compound exhibits the following physical data: C 189° C. N 274.8° C. I.

The following compounds are prepared analogously:
4-[(4-propylcyclohexyl)-ethyl]-phenyl-4-(4-pentylcyclohexyl)-cyclohexyl-carboxylate
4-[(4-pentylcyclohexyl)-ethyl]-phenyl-4-(4-propylcyclohexyl)-cyclohexyl-carboxylate
4-[(4-butylcyclohexyl)-ethyl]-phenyl-4-(4-propylcyclohexyl)-cyclohexyl-carboxylate
2-fluoro-4-[(4-propylcyclohexyl)-ethyl]-phenyl-4-(4-propylcyclohexyl)-cyclohexyl-carboxylate; m.p.=66, c.p.=267
3-fluoro-4-[(4-propylcyclohexyl)-ethyl]-phenyl-4-(4-propylcyclohexyl)-cyclohexyl-carboxylate
2-fluoro-4-[(4-propylcyclohexyl)-ethyl]-phenyl-4-(4-pentylcyclohexyl)-cyclohexyl-carboxylate
3-fluoro-4-[(4-propylcyclohexyl)-ethyl]-phenyl-4-(4-pentylcyclohexyl)-cyclohexyl-carboxylate
2-fluoro-4-[(4-pentylcyclohexyl)-ethyl]-phenyl-4-(4-propylcyclohexyl)-cyclohexyl-carboxylate
3-fluoro-4-[(4-pentylcyclohexyl)-ethyl]-phenyl-4-(4-propylcyclohexyl)-cyclohexyl-carboxylate
2-fluoro-4-[(4-butylcyclohexyl)-ethyl]-phenyl-4-(4-propylcyclohexyl)-cyclohexyl-carboxylate
3-fluoro-4-[(4-butylcyclohexyl)-ethyl]-phenyl-4-(4-propylcyclohexyl)-cyclohexyl-carboxylate
2,3-difluoro-4-[(4-propylcyclohexyl)-ethyl]-phenyl-4-(4-propylcyclohexyl)-cyclohexyl-carboxylate
2,3-difluoro-4-[(4-propylcyclohexyl)-ethyl]-phenyl-4-(4-pentylcyclohexyl)-cyclohexyl-carboxylate
2,3-difluoro-4-[(4-pentylcyclohexyl)-ethyl]-phenyl-4(4-propylcyclohexyl)-cyclohexyl-carboxylate
2,3-difluoro-4-[(4-butyl-cyclohexyl)-ethyl]-phenyl-4(4-propylcyclohexyl)-cyclohexyl-carboxylate

EXAMPLE 2

According to example 1 4-{4-(4-propylcyclohexyl)-cyclohexyl]-ethyl}-phenyl-4-propylcyclohexyl-carboxylate is prepared from 1-[4-(4-propylcyclohexyl)-cyclohexyl-2-(4-hydroxyphenyl)-ethane and 4-cyclohexane carboxylic acid.

The following compounds are prepared analogously.
4-{[4-(4-propylcyclohexyl)-cyclohexyl]-ethyl}-phenyl-4-pentylcyclohexyl-carboxylate
4-{[4-(4-pentylcyclohexyl)-cyclohexyl]-ethyl}-phenyl-4-propylcyclohexyl-carboxylate
4-{[4-(4-butylcyclohexyl)-cyclohexyl]-ethyl}-phenyl-4-propylcyclohexyl-carboxylate
2-fluoro-4-{[4-(4-propylcyclohexyl)-cyclohexyl]-ethyl}-phenyl-4-propylcyclohexyl-carboxylate
3-fluoro-4-{[4-(4-propylcyclohexyl)-cyclohexyl]-ethyl}-phenyl-4-propylcyclohexyl-carboxylate
2-fluoro-4-{[4-(4-pentylcyclohexyl)-cyclohexyl]-ethyl}-phenyl-4-propylcyclohexyl-carboxylate
3-fluoro-4-{[4-(4-pentylcyclohexyl)-cyclohexyl]-ethyl}-phenyl-4-propylcyclohexyl-carboxylate
2-fluoro-4-[[4-(4-propylcyclohexyl)-cyclohexyl]-ethyl}-pentyl-4-propylcyclohexyl-carboxylate
3-fluoro-4-{[4-(4-propylcyclohexyl)-cyclohexyl]-ethyl}-pentyl-4-propylcyclohexyl-carboxylate
2-fluoro-4-{[4-(4-butylcyclohexyl)-cyclohexyl]-ethyl}-propyl-4-propylcyclohexyl-carboxylate
3-fluoro-4-[4-(4-butylcyclohexyl)-cyclohexyl]-ethyl-propyl-4-propylcyclohexyl-carboxylate
2,3-difluoro-4-[4-(4-propylcyclohexyl)-cyclohexyl]-ethyl}-propyl-4-propylcyclohexyl-carboxylate
2,3-difluoro-4-[4-(4-propylcyclohexyl)-cyclohexyl-ethyl}-pentyl-4-propylcyclohexyl-carboxylate
2,3-difluoro-4-[4-(4-pentylcyclohexyl)-cyclohexyl]-ethyl-propyl-4-propylcyclohexyl-carboxylate
2,3-difluoro-4-[4-(4-butylcyclohexyl)-cyclohexyl]-ethyl-propyl-4-propylcyclohexyl-carboxylate The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A four ring ester or ether of the formula I

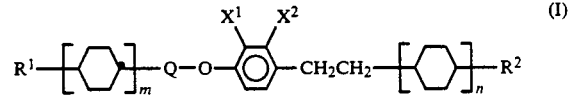

wherein
$R^1$ and $R^2$ each independently are (i) $C_{1-9}$-alkyl, (ii) $C_{1-9}$-alkyl wherein one $CH_2$ group is replaced by oxygen, or (iii) $C_{2-9}$-alkenyl, when one $CH_2$ group is replaced by oxygen,
m and n are each 1 or 2, the sum of m and n being 3,
$X^1$ and $X^2$ are each hydrogen or fluorine, and
Q is —$CH_2$— or —CO—, with the proviso that if m=2, then (a) Q is $CH_2$, (b) at least one of $X^1$ and $X^2$ is F, or (c) both Q is $CH_2$ and at least one of $X^1$ and $X^2$ is F.

2. A compound of claim 1, of the formula

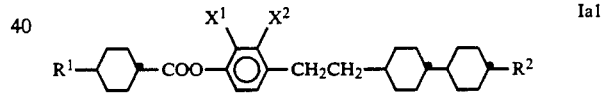

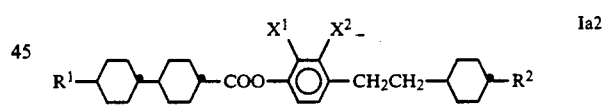

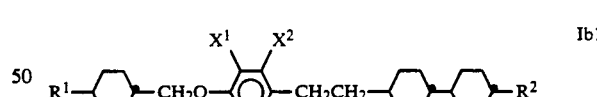

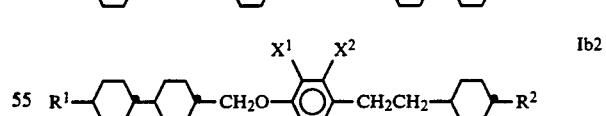

3. A compound of claim 2, wherein $R^1$ and $R^2$ are alkyl.

4. A compound of claim 2, wherein at least one of $X^1$ or $X^2$ is F.

5. A compound of claim 4, wherein $X^1$ is F and $X^2$ is H.

6. A compound of claim 4, wherein $X^1$ and $X^2$ are F.

7. A liquid crystalline medium which is a mixture of at least two liquid crystalline compounds, wherein at least one compound is a four ring ester or ether of claim 1.

8. A liquid crystal display element containing a liquid crystalline medium, wherein the medium is one of claim 7.

9. An electrooptical display device based on a liquid crystalline dielectric, wherein the dielectric is a liquid crystalline medium of claim 8.

10. A compound of claim 1, wherein Q is —CO—.

11. A compound of claim 1, wherein $X^1$ and $X^2$ are each H or F with the proviso that at least one is F.

12. A compound of claim 1, wherein $R^1$ and $R^2$ each independently are (i) $C_{1-9}$-alkyl or (ii) $C_{1-9}$-alkyl wherein one $CH_2$ group is replaced by oxygen.

13. A four-ring ester or ether of the formula I

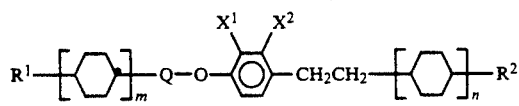 (I)

wherein $R^1$ and $R^2$ each independently are (i) $C_{1-9}$-alkyl, (ii) $C_{2-9}$-alkenyl, (iii) $C_{1-9}$-alkyl wherein one $CH_2$ group is replaced by oxygen, or (iv) $C_{2-9}$-alkenyl when one $CH_2$ group is replaced by oxygen, m and n are each 1 or 2, the sum of m and n being 3, $X^1$ and $X^2$ are each hydrogen or fluorine, and Q is —CO—, with the proviso that at least one of $X^1$ and $X^2$ is F.

14. A compound of claim 13, of the formula

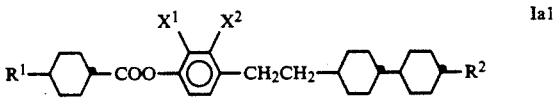 Ia1

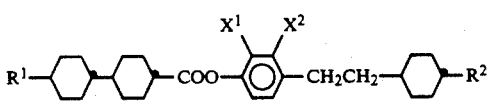 Ia2

15. A compound of claim 14, of the formula Ia2.

* * * * *